United States Patent [19]

Van Roessel

[11] Patent Number: 4,533,953
[45] Date of Patent: Aug. 6, 1985

[54] SIGNAL ANALYZING CIRCUIT FOR A PERIODICALLY OCCURRING SIGNAL

[75] Inventor: Frederik J. Van Roessel, Upper Saddle River, N.J.

[73] Assignee: U.S. Philips Corporation, New York, N.Y.

[21] Appl. No.: 449,075

[22] Filed: Dec. 13, 1982

[30] Foreign Application Priority Data

Dec. 23, 1981 [NL] Netherlands .................... 8105800

[51] Int. Cl.³ .................. H04N 5/14; H04N 5/34; H04N 5/21
[52] U.S. Cl. .................................... 358/160; 358/163
[58] Field of Search ............... 358/160, 163, 166, 167; 377/19, 42, 44, 56; 324/77 A; 328/151

[56] References Cited

U.S. PATENT DOCUMENTS

| | | | |
|---|---|---|---|
| 3,743,772 | 7/1973 | Pieters et al. | 358/163 |
| 3,902,011 | 8/1975 | Pieters et al. | 358/163 |
| 3,919,473 | 11/1975 | Cotter | 358/163 |

Primary Examiner—John C. Martin
Assistant Examiner—Michael D. Parker
Attorney, Agent, or Firm—Thomas A. Briody; William J. Streeter

[57] ABSTRACT

A signal analyzing circuit for a periodically occurring signal such as from a video signal source (VSS). The circuit comprises a store (m) having separate store locations m associated with corresponding regions defined as rows and columns of a picture display of the periodically occurring video signal. In addition, a time signal generator (TG) is provided for the synchronous control of the video signal source (VSS) and the store (m). For filling in a simple manner, without disturbance, the store locations (m) with the mean value of the video signal taken per accurately determined region, the output of the signal source (VSS) is coupled via an analog-to-digital converter (A/D) to counting inputs of a number of counters (BC1 to BC7) equal to the number of regions per row. The counters are operative sequentially and periodically. Each counter (BC1 to BC7) is followed by a buffer register (BR1 to BR7) receiving the counting information in the line blanking period at the end of the last signal period in the row of regions and the counter (BC) is subsequently reset. The buffer register (BR) is followed by the store (m) with the separate store locations (m), which are filled with the previous counting information during the next counting operation.

7 Claims, 2 Drawing Figures

SIGNAL ANALYZING CIRCUIT FOR A PERIODICALLY OCCURRING SIGNAL

BACKGROUND OF THE INVENTION

The invention relates to a signal analysing circuit for a periodically occurring signal. The signal analysis is effected separately in a first number of distinct portions of at least a portion of each signal period contained in a second number of consecutive signal periods. The circuit incorporates a signal source having an output for supplying the periodically occurring signal, a store having separate store locations for storing in each of them information corresponding to signal voltages which always occur in one of the distinct portions of each signal portion contained in the second number of consecutive signal periods. A time signal generator is provided for synchronously controlling the signal source to supply the periodically occurring signals. The store having the separate store locations is present in a third number which is a multiple of said first number.

Such a signal analysing circuit is disclosed in the U.S. Pat. No. 3,743,772, which has for its object the analysis of a video signal as a periodically occurring signal having a signal scanning period and a signal blanking period. In the patent the signal analysis is effected in a line scanning period for ultimately obtaining correction of shading distortion. Such distortion occurs when a television pick-up which operates as a signal source is uniformly illuminated and the resulting video signal results on display in a non-uniformly luminescing picture. The signal analysis is effected in regions of the picture which are defined by rows and columns. The number of columns of regions correspond to the first number and the number of regions per column depends on the number of television lines from which the picture is assembled and the second number of lines per region. With each region occurring in the third number there corresponds a separate store location in the store, in which store location a correction value for the local distortion is to be stored.

The patent briefly describes how the store can be filled with information. For that purpose the signal produced by the signal sources is compared with a reference value and the difference is stored as a correction value in the associated store location through a controlled gate. For the synchronous control of the signal source, the gate, and the store, the time signal generator acts as a correlator.

The patent does not describe in greater detail how filling the separate store locations is effected.

SUMMARY OF THE INVENTION

The invention has for its object a signal analysing circuit where the mean value of the periodically occurring signal for each accurately defined region can reach, without distortion, the associated store location. According to the invention, a signal analysing circuit connects the output of the signal source to an input of an analog-to-digital converter for supplying a pulse train. The pulses train is coupled to counting inputs of a number of counters, which number is equal to said first number of signal period portions, the counters being operative sequentially and periodically for counting pulses under the control of the time signal generator during the distinct portions of each signal period contained in the second number of consecutive signal periods. The counters have parallel outputs for supplying the counting result coupled to parallel inputs of buffer registers whose number is equal to said first number. The time signal generator is coupled to the buffer registers and to the counters for transferring the counting result to the buffer registers at the end of the last signal period contained in the second number of consecutive signal periods. The time signal generator thereafter reset the counters outputs of the buffer registers are coupled to data inputs of the store.

The invention is based on the recognition that the combination of the analog-to-digital conversion of the periodically occurring video signal, the continuous counting of the pulse train, in the signal periods distributed over the counters during the predetermined number of signal periods per region, and the temporary storage in the buffer registers results in an optimum mean value determination for each region suitable for storage in the store locations.

An embodiment of a signal analysing circuit in accordance with the invention fills the store locations at a desired, arbitrary instant during the next count. The time signal generator is coupled to the buffer registers and to the store having the separate store locations for supplying a data transfer signal with pulses occurring after filling of the buffer registers and before the next filling.

An embodiment of a signal analysing circuit in accordance with the invention incorporates simple counters having, only a resetting feature, connects the output of the analog-to-digital converter to inputs of gates whose number is equal to said first number, a different input of each gate being connected to outputs of the time signal generator for supplying sequentially and periodically occurring pulses. The supplied pulses have durations which are equal to the distinct portions of each signal period contained in the second number of consecutive signal periods. The outputs of the gates are connected to counting inputs of the counters.

A further embodiment which incorporates the gates, and an embodiment in which counters have an enabling feature employs a time signal generator which comprises a generator having an input for receiving pulses with a period equal to the distinct portions of each signal period contained in the second number of consecutive signal periods, and separate outputs for supplying sequentially and periodically occurring pulses for performing the pulse count.

A signal analysing circuit in accordance with the invention may include a signal source which operates with a control of its own and the supply of information to the store is effected at typical instants which are adapted to the signal drive. The store forms part of a microcomputer which is connected to a data bus and to an address bus, both having parallel leads. A decoding circuit is connected to said address bus, which decoding circuit has an output for supplying a data input signal. The data input signal is coupled to an input of an additional buffer register which is further connected to the data bus. The buffer register has outputs for supplying a reset signal and a preparatory signal which are connected to corresponding inputs of a flip-flop. The flip flop has a trigger input connected to an output of the time signal generator for supplying a drive signal which is sychronized with the drive at the signal source. The flip-flop has an output for supplying an enable signal to a buffer register which either forms part of the first-mentioned buffer registers or is additional. The last-mentioned buffer register has an input for receiving a data transfer signal supplied by the time signal generator and connections to the data bus.

A further embodiment in which a brief supply of data to the store is realized when the last-mentioned buffer register forms part of the first-mentioned buffer registers which are of the parallel-in, parallel-out type.

In a further embodiment the buffer registers and connected to the counters are coupled to the store with the least possible number of leads. The last-mentioned buffer register is an additional register and the first-mentioned buffer registers are the parallel-in, series-out type having a series input. The buffer registers are provided in series coupled to the data bus with a series-in, parallel-out shift register.

The invention will now be further described by way of example with reference to the accompanying Figures.

DESCRIPTION OF THE PREFERRED EMBODIMENTS

Figure 1:
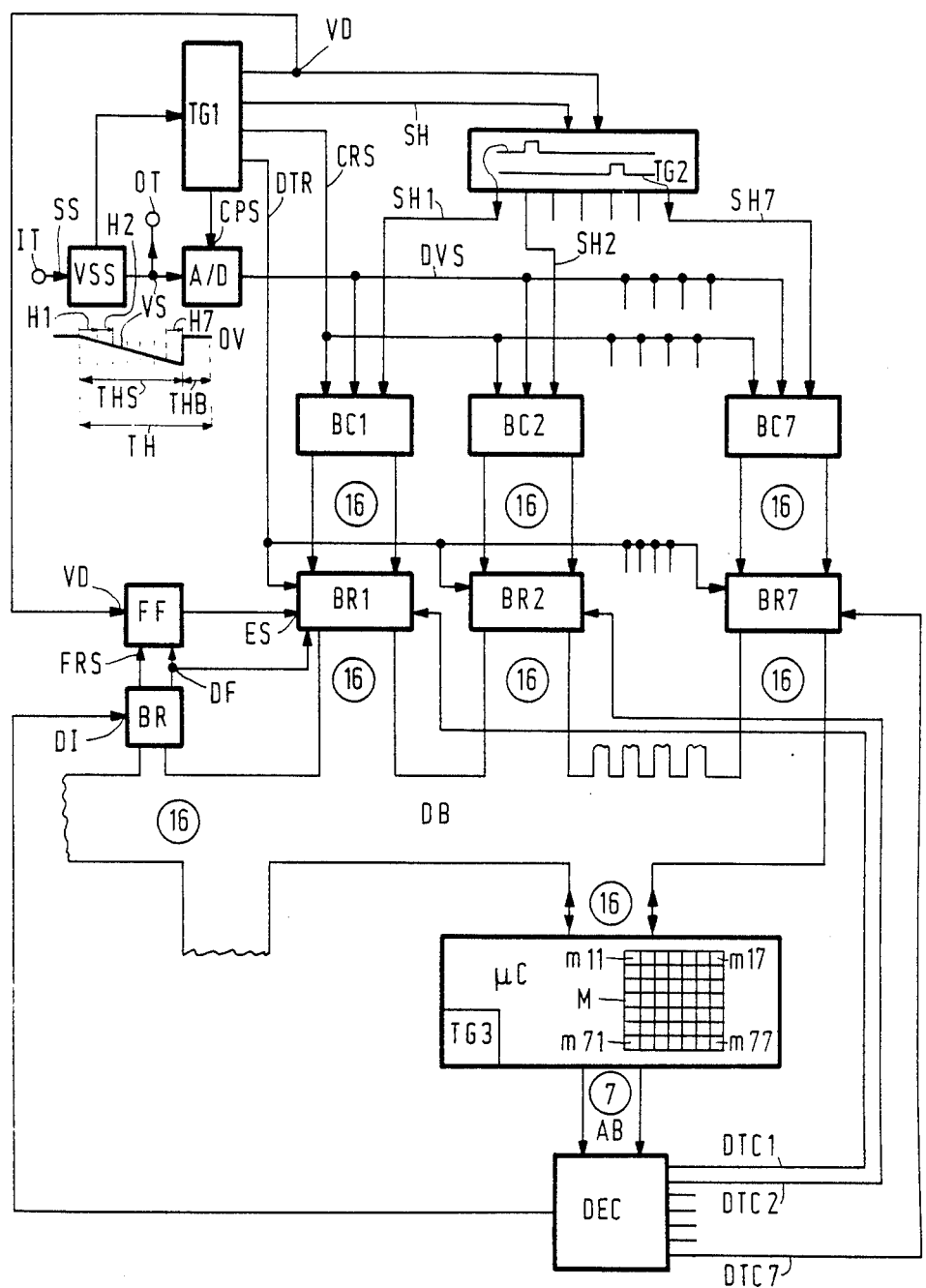
FIG. 1 shows a first embodiment of a signal analysing circuit in accordance with the invention.

FIG. 1 shows a signal analysing circuit comprising a video signal source VSS, a store M and a time signal generator (TG) comprising three sub-generators TG1, TG2 and TG3. The store M (and any other stores) and the generator TG3 form part of a microcomputer $\mu$C. The store M has separate store-locations m. Rows of store locations are denoted m11 ... m17 and m71 ... m77, columns of store locations are denoted by m11 .. . m71 and m17 ... m77. The rows and column of store locations m correspond to similarly arranged regions in the television display of a video signal VS to be supplied by the signal source VSS. The regions then include corresponding portions of consecutive television lines from which a television picture is assembled. FIG. 1 shows a possible signal variation of the video signal VS as a function of the time. TH denotes a line period which comprises a line scanning period THS and a line blanking period THB. In the line blanking periods THB the ground potential of OV is, for example, present in the video signal VS. The line scanning periods THS are divided into distinct portions which are denoted by H1, H2 ... H7. In the example given there are seven portions as the first number of distinct portions of a signal period. The number of television lines occurring in each region are in this example the second number of consecutive signal periods. For an interlaced 625-line television system 40 lines per interlaced television field are an example of the second number. Seven regions per column may then, for example, be present in each interlaced television field, as approximately 25 lines of the 312.5 lines per television field occur in field blanking periods. It is further possible to use different dimensions for the regions and to give, for example, the regions in the centre of the television picture a larger dimension than the regions at the edges. Thus, the portions H1 and H7 of the line scanning period THS are smaller than the remaining portions, and the second number of consecutive line periods per region is greater in the centre and less at the ends of the television picture.

The preceding also holds for an interlaced 525-line television system in which the second number is, for example, equal to 34 lines per interlaced television field or has a variable number of this order of magnitude, respectively which results in seven regions per column.

By using a switchable construction of the generator TG1 the several possibilities can be realized in a simple manner in the signal analysing circuit.

From the examples given it follows that there are seven regions per row and seven regions per column, resulting in a third number of regions per television picture equal to $7 \times 7 = 49$. The store M having seven rows and columns of store locations m correspond to the third number of regions. The simplest construction of the store M shown would be a construction having the single row m11 ... m17 of seven store locations m, which may further be extended with integral multiples thereof.

The video signal source VSS supplies the video signal VS under the control of a synchronizing signal SS, which is applied to an input terminal IT of the circuit of FIG. 1. The signal SS is, for example, a composite synchronizing signal having line and field synchronizing pulses and equalizing pulses. The output of the source VSS having the video signal VS is connected to an output terminal OT and to an input of an analog-to-digital converter A/D. The video signal VS is available at the output terminal OT for television picture display and test purposes, respectively. In color television, the signal source VSS produces, for example, a luminance signal or a single or composite color signal as the signal VS.

Applying the signal VS to the A/D-converter is important for the signal analysis to be performed. A clock pulse signal CPS produced by the generator TG1, which is controlled from the signal source VSS is further applied to the A/D converter. In the A/D converter analog signal VS is converted into a pulse train which becomes available at the converter output. The conversion has to be optimal, that it to say it must be effected linearly and for this reference is made to the non-prepublished Netherlands Patent Application No. 81052554 (PHN 10.199). The output of the A/D-converter carries a digital signal DVS in which the maximum value of the signal VS corresponds to a pulse train having the clock pulse frequency. Half of this maximum value corresponds to a pulse train having half the clock pulse frequency, etc. The linear conversion implies that the instantaneous signal value as a part of the maximum signal value corresponds to a pulse train frequency which is the same portion of the clock pulse frequency. The frequency of the clock pulse signal CPS is, for example, 5 MHz.

At the generator TG 1 it is shown that it further produces a field or vertical driving signal VD, a synchronizing signal SH which has pulse edges corresponding to the initial instants of the portions H1, H2, . . . H7 of the line scanning periods THS, a counter reset signal CRS and an information or data transfer signal DTR. The signals VD and SH are applied to the generator TG2. The generator TG2 has seven outputs which carry signals SH1, SH2, ... SH7. The signals SH1, SH2, ... SH7 have consecutive, periodically occurring pulses having pulse durations which are equal to the distinct portions H1, H2, ... H7 of the signal periods TH in the signal VS. The generator TG2 is, for example, a 8-stage Johnson counter having a counting input to which the signal SH is applied, the signal VD serving as an external reset signal. Instead thereof, the generator TG2 may be formed from shift registers. In addition, an external reset per line period TH is alternatively possible. The signals SH1, SH2, . . . SH7 are separately applied to enable inputs of seven binary counters BC1, BC2, . . . BC7, counting inputs of which are connected to the output of the A/D converter, which output carries the digital signal DVS. The counters BC1, BC2, . . . BC7 have each a reset input to which the counter reset signal CRS is applied.

It can be seen that the pulses in the digital signal DVS are counted by the binary counter BC1 during the portion H1 of the line period TH and by the counter BC2 during the portion H2, etc. and finally by the counter BC7. Thereafter the same procedure occurs in the next line scanning period THS, more specifically in the second number of line periods TH associated with the row of regions. At the end of the portion H7 of the line scanning period THS, in the last line period TH in the region, the counters BC1, BC2, . . . BC7 are filled with a counting result which corresponds to the mean value of the signal VS across the relevant region. In FIG. 1 it is shown that the counters BC1, BC2, . . . BC7 each have 16 parallel outputs of which, for example, 12 are employed for carrying the counting result in a binary code.

The 16 outputs of the seven counters BC1, BC2, . . . BC7 are connected to 16 inputs of seven buffer registers BR1, BR2, . . . BR7. The buffer registers BR1, BR2, . . . BR7 have first and second formation or data transfer inputs, the first inputs being interconnected and receiving the information or data transfer signal DTR and the second inputs being supplied with separate information or data transfer signals DTC1, DTC2, . . . DTC7. The signal DTR has a transfer pulse in the line blanking period THB of the last line period TH in the row of regions, in response to which the counting results of the counters BC1, BC2, . . . BC7 are transferred to the buffer registers BR1, BR2, . . . BR7. Thereafter, in the same line blanking period THB a reset pulse occurs in the signal CRS in response to which the counters BC1, BC2, . . . BC7 are reset to zero and are ready to start the next count in the portions H1, H2, . . . H7 of the line scanning periods THS of the line periods TH in the subsequent row of regions. The pulse in the signal DTR coincides with, for example, a television line synchronizing pulse, the pulse in the signal CRS coinciding, for example, with a burst gate pulse in color television. The counting results which are temporarily stored in the buffer registers BR1, BR2, . . . BR7 are a measure of the mean value of the signal VS considered over the relevant region.

The buffer registers BR1, BR2, . . . BR7 are shown in FIG. 1 with 16 parallel outputs each. The stored counting result becomes available at 12 of the 16 parallel outputs when a pulse is present in the data transfer signal DTC1, DTC2, . . . DTC7 applied to the relevant register. The buffer registers BR1, BR2, . . . BR7 are of the type having 3-state outputs. The buffer register outputs are connected to data bus DB having 16 leads, the microcomputer $\mu C$ being connected to this data bus DB. The microcomputer $\mu C$ is further connected to an address bus AB which has 7 leads and is further connected to a decoding circuit DEC which supplies the data transfer signals DTC1, DTC2, . . . DTC7. Of the address bus AB for example 6 leads of the 7 leads are employed for addressing at the 49 store locations m of the store M, the remaining lead serving to instruct data input or correction data output at the microcomputer $\mu C$. When the instruction to data input is given the decoding circuit DEC supplies in addition to the data transfer signals DTC1, DTC2, . . . DTC7 which have pulses at instants suitable therefore, a data input signal DI to a buffer register BR. The buffer register BR is connected to the data bus DB. After receipt of the data input signal DI the buffer register BR applies a flip-flop reset signal FRS at instants determined by the microcomputer $\mu C$ and thereafter a preparatory signal DF to a flip-flop FF. The flip-flop FF is, for example, of the D-type, a logic value at a D input at the occurrence of a trigger pulse edge at a trigger input thereof resulting in the same logic value at the flip-flop output if this value is not already present. The vertical-drive signal VD is applied as a trigger signal to the flip-flop FF. After reset of the flip-flop FF producing the logic 0 at the flip-flop output, the logic 1 in the preparatory signal DF which corresponds to data input and the occurrence of the trigger pulse edge in the vertical-drive signal VD, this results in the logic signal 1 at the flip-flop output. An enable signal ES is then applied to the buffer register BR1. Enabling the buffer register BR1, after the occurrence of the trigger pulse edge in the vertical-drive signal VD, results in the next data transfer pulse in the signal DTR one of the four outputs, which do not contribute to the counting results, (12), of the buffer register BR1 to carry the logic 1. This logic 1 serves as a sign for the microcomputer $\mu C$ that the buffer registers BR1, BR2 . . . BR7 are filled with the counting results which are associated with the first row of regions and are to be stored in the first row m11 . . . m17 of the store locations m. Instead of applying the enable signal ES to the register BR1 this enable signal may alternatively be applied to one of the other registers BR2 . . . BR7.

During the period of time the counters BC1, BC2, . . . BC7 are counting the pulses of the second row of regions, the microcomputer $\mu C$ has the opportunity to read through the data bus DB, the counting results from the buffer registers BR1, BR2, . . . BR7 and to store them in the row m11 . . . m17 of store locations m. After the counting result has been read from the buffer register BR1 the microcomputer $\mu C$ causes the buffer register BR to supply the logic 0 in the signal DF, as a result of which the buffer register BR1 is reset internally. Thereafter the logic 1 returns again in the signal DF. After the transfer of information from the buffer register BR7, this results in the next data transfer pulse in the signal DTR associated with the completed count at the second row of regions, applying the indication thereof to the microcomputer $\mu C$.

After the fourty-nineth store location m77 of the store M has been filled the microcomputer $\mu C$, for example, terminates according to its program the data input and storage. Thereafter the stored data can be processed according to program by the microcomputer $\mu C$. After data processing, the microcomputer $\mu C$ can store the ultimately obtained correction data in the store M or in a different store, whereafter the correction data can be supplied, for example cyclically and synchronously, to the data bus DB for combination, after a digital-to-analog-conversion, not shown, with the analog signal VS which is obtained from the output terminal OT.

It can be seen that the signals ES and DF are operated to couple the data input at the microcomputer $\mu C$ synchronously to the signal generation at the signal source VSS. When the microcomputer $\mu C$ is not engaged in this data input, it may be operative for signal correction. After it has received an instruction to input data, the microcomputer μC prepares itself for this purpose and after the signal sequence DI, FRS, DF, VD, ES, DTR, DTC the microcomputer μC couples itself to the buffer registers BR1, BR2, . . . BR7 and consequently to the signal source VSS, which source is controlled by the signal SS. During the line blanking period THB of the last line period TH of each row of regions the counting result is then first taken over by the buffer registers BR1, BR2, . . . BR7 whereafter the counters BC1, BC2, . . . BC7 are reset. Thereafter, during the next counting operation the associated row of store locations m may be filled at any desired, arbitrary instant. After filling, until the instant at which the next counting result becomes available, the microcomputer μC may perform a different instruction.

The count at the pulse train in the digital signal DVS by the counters BC1, BC2 . . . BC7 under the control of the generator TG2 ensures that no pulses are missed, the regions having been accurately determined. The result is an optimum, disturbance-free count per region. The transfer of the counting result to the buffer registers BR1, BR2, . . . BR7 and resetting the counters BC1, BC2, . . . BC7 also ensures that no disturbance occurs as these operations are effected in a line blanking period THB.

Figure 2:
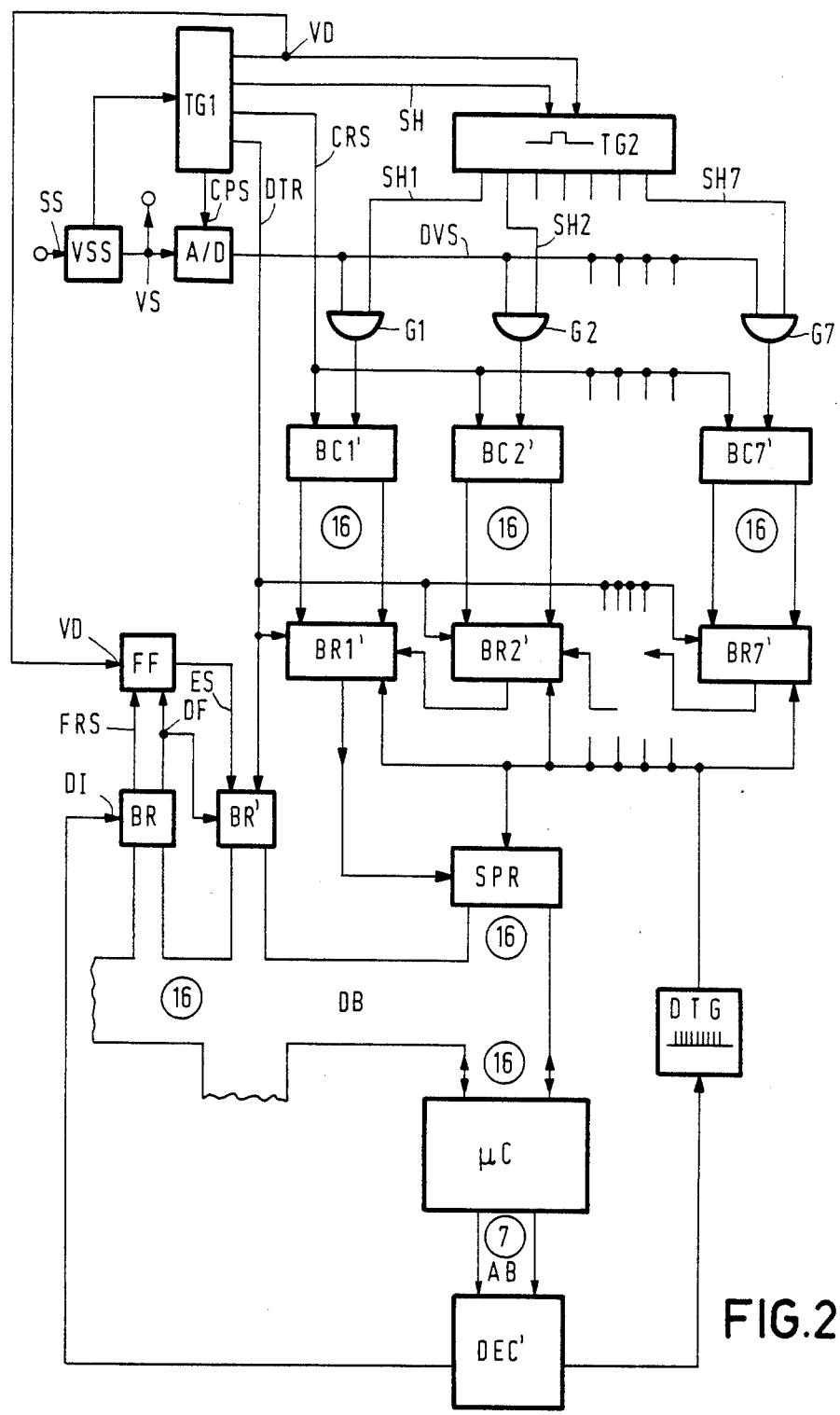
FIG. 2 shows a second embodiment.

The signal analysing circuit shown in FIG. 1 comprises binary counters BC1, BC2, . . . BC7 incorporating an enable feature to which, to employ this enable feature, the signals SH1, SH2, . . . SH7 are applied to enable inputs. FIG. 2 shows a different solution in which counters of a simple construction without enable features can be used. In FIG. 1 it is further shown that the buffer registers BR1, BR2, . . . BR7 are of the parallel-in, parallel-out type. This renders a brief supply of data to the microcomputer μC possible, but seven connections of 16 leads to the data bus DB are then however required. FIG. 2 shows a different solution which requires the least possible number of connections and leads but which, however, increases the time needed to supply the data to the microcomputer μC.

Components and signals which have already been described with reference to FIG. 1 and which are also comprised in FIG. 2 are given the same reference numerals. Somewhat altered or additional components which have the same functions are denoted by means of an accent notation.

In FIG. 2 the generator TG2 applies the signals SH1, SH2, . . . SH7 to inputs of respective gates G1, G2, . . . G7, to a further input of which the digital signal DVS is applied. The outputs of the gates G1, G2, . . . G7 are connected to the counting inputs of the respective binary counters BC1', BC2', . . . BC7', which do not have an enable feature. The gates G1, G2, . . . G7 provide for the distribution of the pulse train in the digital signal DVS over the counters BC1', BC2' . . . BC7'.

FIG. 2 shows buffer registers BR1', BR2' . . . BR7' which are of the parallel-in, series-out type and which further have a series input. The series-input of the buffer register BR1' is connected to the output of the buffer register BR2', the further buffer registers being connected similarly, which results in a series of buffer registers BR1', BR2' . . . BR7'. The output of the buffer register BR1' forms the output of the series and is connected to a signal input of a series-in, parallel-out shift register SPR. The shift register SPR is of the type having 3-state outputs, these outputs being connected to the data bus DB. A clock pulse input of the register SPR and of the registers BR1', BR2' . . . BR7' is connected to the output of a data transfer pulse generator DTG the input of which is connected to the output of a decoding circuit DEC'. After the instant at which the microcomputer μC receives an indication (still further to be described) that the buffer registers BR1', BR2' . . . BR7' have been filled with the counting results (signal DTR), the generator DTG supplies seven bursts of 16 clock pulses in response to which the counting results are applied sequentially from the buffer registers BR1', BR2' . . . BR7' to the register SPR. Between the clock pulse bursts the register SPR applies the counting results to the microcomputer μC.

The indication for the microcomputer μC of FIG. 2 that the buffer registers BR1', BR2' . . . BR7' have been filled with the counting results, is supplied by an additional buffer register BR'. The additional buffer register BR' performs the same function as the function performed by the buffer register BR1 of FIG. 1 under the control of the enable signal ES, the data transfer signal DTR and the signal DF with its reset function.

The preceding describes that in a field period the counting is effected at the regions, it being possible to process the recorded information after storage in the store M. If so desired it is possible to perform the count repeatedly in each period during a number of field periods, so that, as the counting result, a mean value per region is obtained, considered over the number of field periods.

The signal analysing circuits have been described on the basis of a video signal VS as an example. The circuits in accordance with the invention are not limited to this signal. Other examples of signals which may be analyzed are facsimile signals and radar signals.

Thus there has been described two embodiments of a signal analyzing circuit in accordance with the invention. Those skilled in the art will recognize other embodiments described more particularly by the claims which follow.

What is claimed is:

1. A circuit for analyzing a number of distinct portions of a signal during a consecutive number of signal periods comprising:
   a signal source for generating said signal;
   an analog to digital converter connected to receive said signal for producing a pulse train having a frequency proportional to said signal magnitude;
   a plurality of counters equal in number to said number of distinct portions, said counters operative sequentially and periodically for counting pulses of said pulse train during said distinct portions of each signal period contained in the consecutive signal periods, said counters having parallel outputs for supplying the counting signal;
   a plurality of buffer registers connected to said counter outputs;
   a time signal generator controlled by said signal source to produce clock signals in synchronism with said signal, said clock signals controlling the counting of said counters, and controlling said buffer registers for transferring the contents of said counters to said buffer registers at the end of the last of said signal periods, and for resetting said counters; and
   store means having a number of separate storage locations which are a multiple of said number of distinct portions for storing the count result obtained for each portion of each of said periods, whereby information corresponding to the signal voltages occurring in one of said distinct portions of each of said signal periods is made available.

2. A signal analyzing circuit according to claim 1 wherein said store means is provided by a memory of a microcomputer, said microcomputer including a data bus and address bus, said signal analyzing circuit further comprising:
- a decoder connected to said address bus for supplying a data input signal;
- an additional buffer register connected to receive said data signal and to said data bus, said additional register providing a reset signal and a preparatory signal;
- a flip flop connected to receive said preparatory signal and said reset signal, said flip flop having a trigger input connected to receive from said time signal generator a drive signal synchronized with the signal source signal, said flip flop supplying an enable signal to the first of said buffer registers.

3. A signal analyzing circuit according to claim 2, wherein said store means is provided by a memory of a microcomputer, said microcomputer including a data bus and an address bus, said signal analyzing circuit further comprising:
- a decoder connected to said address bus for supplying a data input signal;
- a serial parallel shift register connected to receive data from said buffer registers, and connected to said data bus;
- said serial parallel shift register transferring data from said buffer registers to said microcomputer memory over said data bus;
- an additional register connected to receive a data input signal from said decoder and connected to said data bus; and
- a flip flop connected to receive first and second signals from said additional register, and a trigger signal from said time signal generator.

4. A signal analysing circuit as claimed in claim 1, wherein the time signal generator is coupled to the buffer registers and to the store means having the separate store locations, for supplying a data transfer signal with pulses occurring after filling of the buffer registers and before the next filling of said buffer registers.

5. A signal analysing circuit as claimed in claim 1 or 4, wherein the output of the analog-to-digital converter is connected to inputs of gates whose equal in number to said first number, a different input of each gate being connected to outputs of the time signal generator for supplying sequentially and periodically occurring pulses with pulse durations which are equal to the said distinct portions of each signal period contained in the consecutive signal periods, outputs of the gates being connected to counting inputs of the counters.

6. A signal analysing circuit of claim 1 wherein the time signal generator comprises a generator having an input for receiving pulses with a period equal to said distinct portions of each signal period contained in the consecutive signal periods and separate outputs for supplying sequentially and periodically occurring pulses for performing the pulse count.

7. A signal analysing circuit as claimed in claim 2, wherein said buffer registers are of the parallel-in, parallel-out type.

* * * * *